United States Patent [19]
Amelina et al.

[11] Patent Number: 5,487,158
[45] Date of Patent: Jan. 23, 1996

[54] METHOD AND PROCEDURE CALL MECHANISM FOR CALLING 16-BIT FUNCTIONS FROM 32-BIT FUNCTIONS

[75] Inventors: Iam R. Amelina; David M. Mooney, both of Toronto; Kevin A. Stoodley, Richmond Hill, all of Canada

[73] Assignee: International Business Machines Corporation, Armonk, N.Y.

[21] Appl. No.: 301,280

[22] Filed: Sep. 6, 1994

Related U.S. Application Data

[63] Continuation of Ser. No. 43,454, Apr. 6, 1993, abandoned.

[51] Int. Cl.⁶ .................................................. G06F 9/40
[52] U.S. Cl. ........................... 395/375; 364/DIG. 1; 364/247.7; 364/254; 364/254.5
[58] Field of Search ............. 364/DIG. 1 MS File, 364/DIG. 2 MS File; 395/401, 500, 375, 80

[56] References Cited

U.S. PATENT DOCUMENTS

| | | | |
|---|---|---|---|
| 4,297,743 | 10/1981 | Appell et al. | 395/650 |
| 4,445,173 | 4/1984 | Pilat et al. | 395/375 |
| 4,569,018 | 2/1986 | Hummel et al. | 395/425 |
| 4,928,237 | 5/1990 | Bealkowski et al. | 395/400 |
| 5,097,533 | 3/1992 | Burger et al. | 395/500 |
| 5,127,103 | 6/1992 | Hill et al. | 395/575 |
| 5,129,070 | 7/1992 | Dorotte | 395/400 |
| 5,144,551 | 9/1992 | Cepulis | 395/425 |
| 5,146,593 | 9/1992 | Brandle et al. | 395/700 |

*Primary Examiner*—Robert B. Harrell
*Attorney, Agent, or Firm*—Baker, Maxham, Jester & Meador

[57] ABSTRACT

In the field of mixed 16-bit and 32-bit code, a method and mechanism are provided to implement alterations in the dynamic portion of memory containing the data objects used by code in the 32-bit environment so that such data is accessible to code from the 16-bit environment. Once the data objects in the stack are accesible to the 16-bit code, a function in the 32-bit code can successfully call a function in 16-bit code.

18 Claims, 3 Drawing Sheets

METHOD AND PROCEDURE CALL MECHANISM FOR CALLING 16-BIT FUNCTIONS FROM 32-BIT FUNCTIONS

This application is a file wrapper continuation of U.S. application Ser. No. 08/043,454, filed Apr. 6, 1993, now abandoned.

FIELD OF THE INVENTION

The present invention relates generally to the field of function call linkage in a mixed 16-bit/32-bit code computing environment, and is particularly directed to providing a hardware implemented method and call mechanism for calling 16-bit code from 32-bit code. The present invention is neither language nor operating system dependant. Its particular application, though, is for iAPX system architecture (80386, 80486 and other processers of this architecture made by Intel, or competitive implementations), which permit the simultaneous processing of 16 and 32-bit code.

BACKGROUND OF THE INVENTION

The development of complex computer programs has led to an increasing dependence by developers on a data storage mechanism known as a stack, so as to avoid the requirement for massive static (or permanent) storage within the computer programs themselves.

Instead of static memory, the programs use dynamic storage in the stack which must be allocated whenever functions or procedures are called. Thus, inactive functions do not use any storage space. The active functions' local data are each stored in a procedure activation record or stack frame, with each variable or data object for the procedure having a unique location within the activation record demarcated by beginning and ending addresses.

The environments for early operating system were in 16-bit code based on collections of memory objects called segments not exceeding 64K bytes in size. However, it was found that 16-bit programs do not deal well with large pieces of data due to the 64K byte limitation. Consequently, the development of 32-bit code that could handle larger programs and was actually easier to program in, resulted in a move towards use of 32-bit coding in new programs.

Despite the migration of the computing environment from 16-bit code to 32-bit code, many existing applications and libraries still exist in 16-bit code only. These tools are often found to be incompatible with the components in 32-bit programs.

One reason for this is the 64K byte accessing limit of 16-bit code routines not found in 32-bit code. For example, in IBM's OS/2, 32-bit addressing is accomplished by creating a very large segment (up to 4 gigabytes in size) in stack memory, and using all near adresses inside this very large segment. The Data and Code segments of any function are mapped to this very large address space, and their limits set to varying sizes up to 4 G, with the possibility, in any variable or data object, such as the stack, or even at the end of the stack last, of easily exceeding the 64K limit applicable to 16-bit applications.

The parameters and local variables allocated in a procedure which calls 16-bit code must not cross any 64K byte boundaries if the 16-bit code routine is to be able to access the parameters and local variables correctly.

Another area of incompatibility between 16 and 32-bit code is the difference in format of the pointers associated with each type of code.

A pointer is a variable containing the address of another variable or data object.

The base linear address for all pointers in 32-bit code is set at zero, and consequently, 32-bit pointers are said to be "flat" or "linear". Pointers in 16-bit code are in the form of a segment number and the offset location of the beginning of the data object within the segment. No provision is made in calculating the values of 16-bit code pointers for a uniform base linear value as in 32-bit code pointers.

The result is that pointers cannot be shared or passed between 16 and 32-bit code without conversion to the other type of pointer. One method of achieving this conversion involves structuring the 64K byte segments contiguously (ie, arranging the 64K byte boundaries consecutively) in the stack as a ranked series of "tiles", the first tile being identified as the "zero" segment, the second as 1, and so on. A simple mathematical conversion of the linear pointers to multiples of 64K, with the remainder representing the offset within the segment, can be then be done. The converted segmented pointers can also be easily re-converted to the 32-bit code format on return of the 16-bit code function.

In the ordinary course of culling from 32-bit code to 16-bit code, a 32-bit program would pass the pointer for a data object to a 16-bit routine. Even in compatible format, if the pointer points to data that spans a 64K boundary, the 16-bit routine will be unable to reference the entire data object, and program implementation will be, at best, unstable, and possibly unworkable.

Generalized solutions have been offered to deal with such matters as the problems raised in a situation where access to an extended address space may be required by systems having different word lengths without the basic addressing system reflecting their physical structure (U.S. Pat. No. 4,493,027—Katz), and memory accesses utilizing different data structures (U.S. Pat. Nos. 5,060,186—Barbagelata, and 4,297,743—Appell).

However, previous solutions to the specific problem of mixed 16/32-bit calls have been limited to providing specialized subroutines, often generated by the compiler each time, to deal individually with each instance of a 16-bit call. In such specialised subroutines, the layout of the parameter list all opportunities for 64K byte boundaries to cause problems in runtime had to be known at compile time. It is not always possible to know at compile time where all these 64K byte boundaries are located on the stack, so that even this solution is limited.

SUMMARY OF THE INVENTION

It is therefore an object of the present invention to provide a general purpose method and mechanism, automatically generated and implemented within a computer, in which 16-bit code is able to correctly access segmented data objects in a stack, having regard to the 64K byte boundary limit of the 16-bit segments, despite the allocation of the data objects within the stack in 32-bit code format.

It is a further object of this invention to provide a mechanism for calling 16-bit code from a 32-bit program which is transparent to the user.

It is also an object of the present invention to permit 32-bit program to concurrently interact with the 16 and 32-bit calling without regard for 64K byte boundaries.

The term "thunk" is a general term referring to the activities that take place in moving from one portion of a program to another. In the present application, the term "thunk" is used to denote the specific series of activities (and the hardware recognised mechanisms to effect the activities) that take place to permit the transfer of control between 16 and 32-bit environments pursuant to compilation of a program or subroutine.

Accordingly, the present invention provides a method for calling 16-bit code from a 32-bit code subroutine having allocated to it at least one stack frame in a memory stack, through the computer implemented steps of defining a consecutive series of 64K byte boundaries in relation to the stack and providing means for accessing, from below a 64K byte boundary, variables and data objects spanning any 64K byte boundary. A parameter list compatible with 16-bit code calling is built in the stack, and stack space for data to be used by the 16-bit code is allocated. Preferably, providing means that the variables or data objects spanning any 64K byte boundary are accessible below a 64K byte boundary includes the step of copying all variables or data objects at or beyond any 64K byte boundary below that 64K byte boundary in the stack.

According to the present invention, a procedure call mechanism is provided for implementing calls to 16-bit code from 32-bit code in a computer program having allocated to it at least one stack frame in a memory stack. The procedure call mechanism includes a prologue element for a thunk for locating any data object spanning a 64K byte boundary in the stack associated with the program and providing means for accessing, by copying, such data object below that 64K byte boundary. The thunk prologue element is preferably implemented once during processing of a 32-bit subroutine including any number of calls to 16-bit subroutines. The procedure call mechanism also includes a thunk means, preferably implemented on each call to 16-bit code, for allocating stack space for use by the 16-bit code called by the 32-bit subroutine.

DESCRIPTION OF THE PREFERRED EMBODIMENT

In the preferred embodiment of the present invention, the thunk prologue and general purpose thunk subroutines reside in the runtime library for a C language compiler. In the preferred application, the user (ie, other components within the system) will never implement a call to the prologue routine for a thunk or general purpose thunk elements of the procedure call mechanism. Rather, all calls to the prologue and thunk elements are initiated by the compiler following standard compiler call format.

The preferred embodiment is directed to a stack that grows down toward smaller addresses, although it would be obvious to one skilled in the art to modify the invention to accomodate a stack that grows up.

Initiation of the thunk mechanism occurs when the compiler processing a 32-bit subroutine recognises a call within the subroutine to a 16-bit function. In response, the compiler issues a call to the thunk prologue element or routine that will provide general advance preparation, as described hereafter, for implementing any 16-bit call contained in the subroutine.

The thunk prolog essentially ensures that there are no 64K boundaries in the stack frame for the 32-bit subroutine that will interfere with implementation of each of the 16-bit functions when called by the 32-bit subroutine.

Before first accessing the stack .the thunk prologue implements a reserve storage just below the 64K byte boundary of 12 bytes for saving all the values in registers that it may need to use. In addition, the original value of the stack pointer (ESP) is saved at the top of the stack so that the stack can be returned to its original layout once the entire 32-bit subroutine has been terminated.

The thunk prologue then performs its main function of checking the stack frame for a 64K byte boundary, by taking the starting address of the stack frame, adding the total size of the stack frame to that address using a 16-bit add, and then checking the conditions codes in the central processing unit (CPU) to see if the carry flag is set after the add (ie, the add overflowed 64K bytes). If so, there is a 64K byte boundary in the stack frame.

Figure 1:
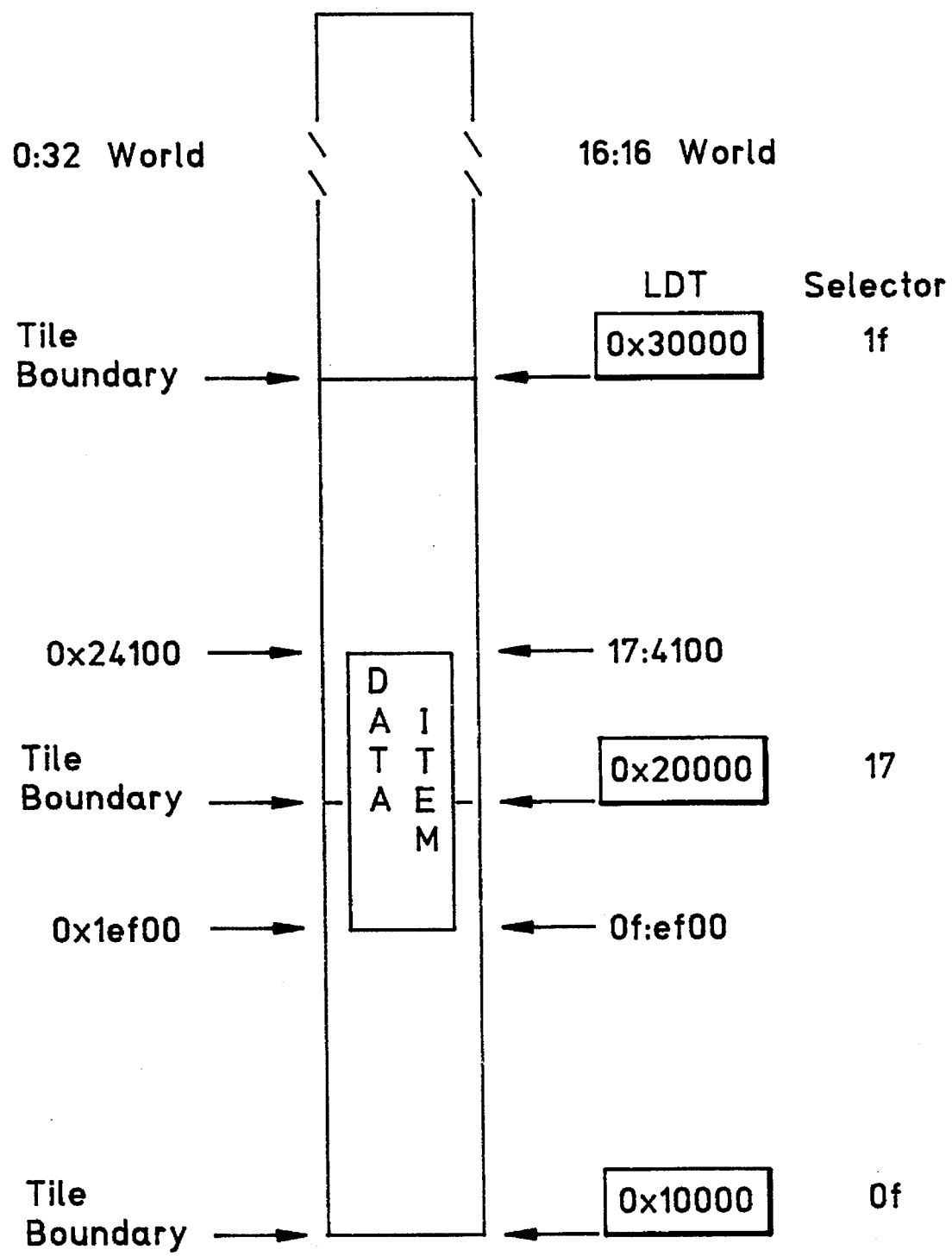
FIG. 1 is a schematic representation of stack memory illustrating a data item spanning a 64K byte boundary.
Figure 2:
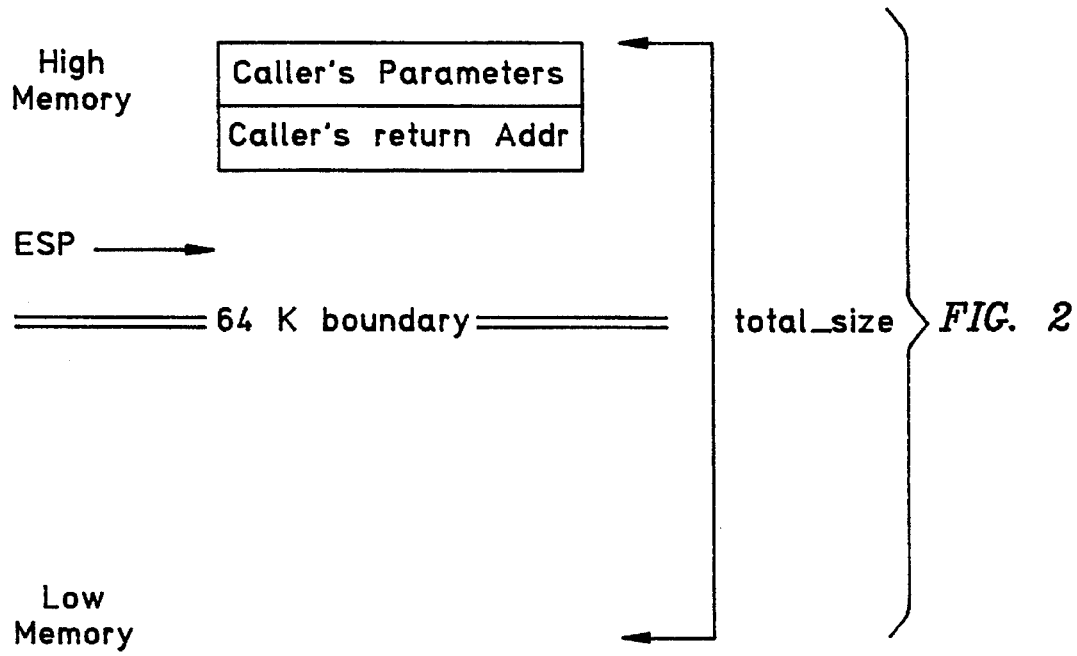
FIGS. 2, 3 and 4 represent detailed views of the schematic stack illustration on implementation of a prologue element or routine for a thunk according according to the invention, FIG. 2 representing a view of the stack before implementation of the thunk prologue, and FIGS. 3 and 4 representing views of the stack after implementation of the thunk prologue in the procedure call mechanism, FIG. 3 illustrating the situation where a 64K byte boundary is found in the stack, and FIG. 4, on the same page as FIG. 2, illustrating the situation where no 64K byte boundary is found.
Figure 3:
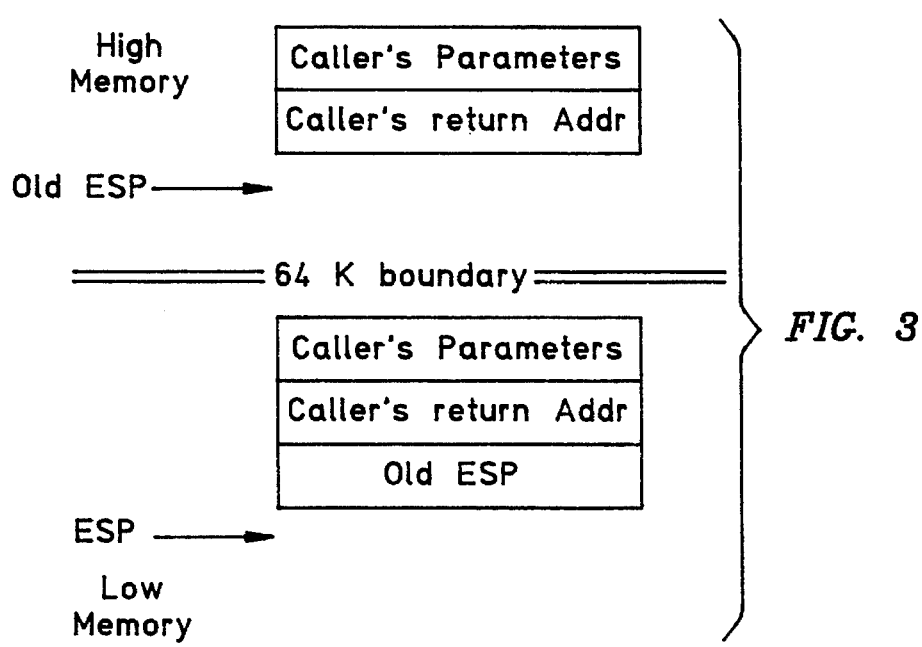
Figure 4:
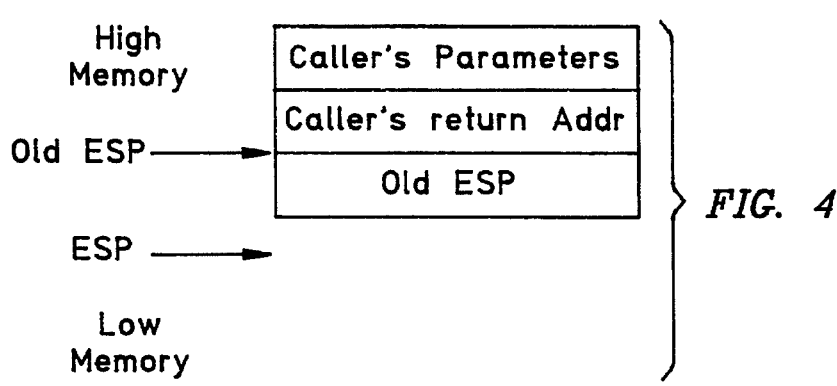
Figure 5:
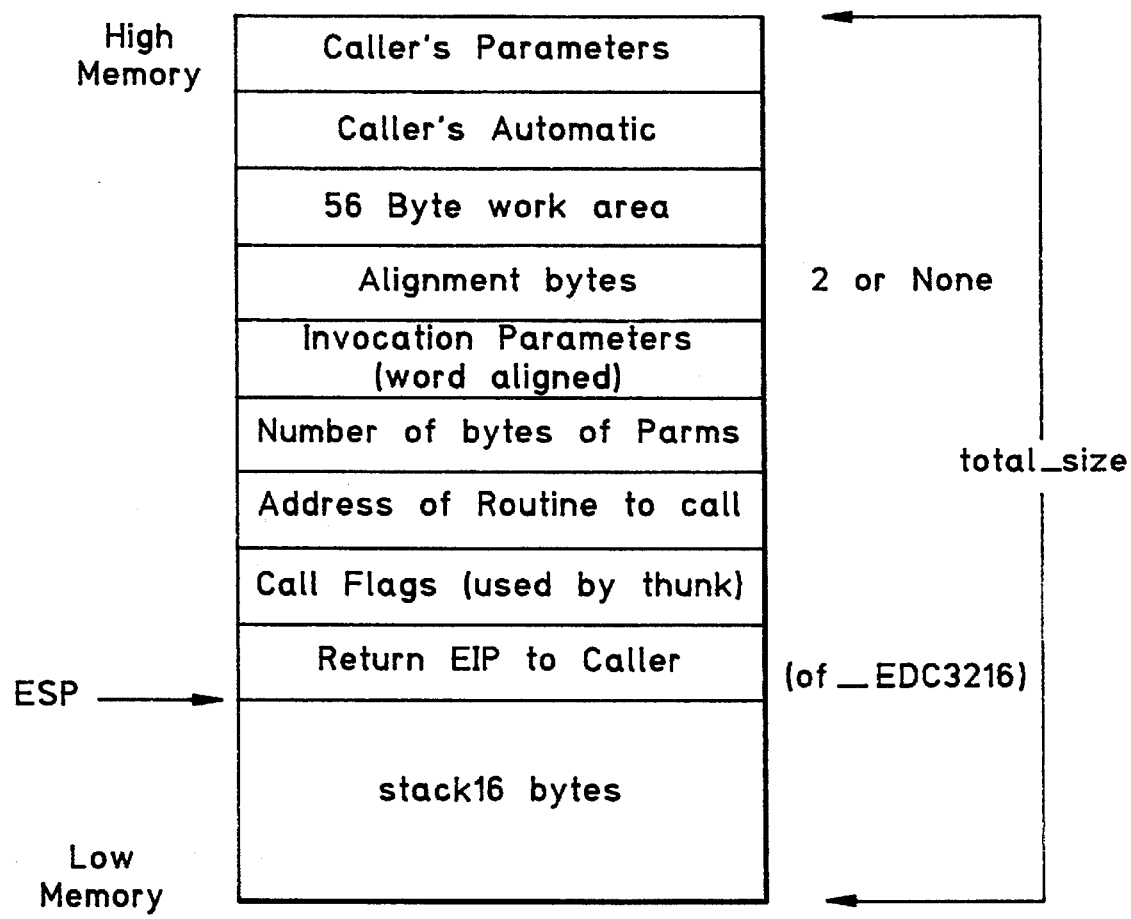
FIG. 5 is a schematic representation of a stack frame layout following implementation of a thunk, according to the invention.

On recognising a 64K byte boundary in the stack frame, the thunk prologue grows the stack down to the extent necessary to copy the stack frame below the 64K byte boundary. Following this, it copies the caller's parameters from above the 64K byte boundary to below the 64K byte boundary, restores the original values of the altered registers that were saved, and returns, leaving the old value of the stack pointer (ESP) on top of the stack, as illustrated in FIG. 3. When the 32-bit subroutine returns to its caller, a POP ESP instruction to restore the original stack pointer value is issued, thereby restoring the stack to the state in which it was before before the thunk prologue element performed its functions.

Where no 64K boundary is found in the stack frame, the thunk prologue element simply restores the saved registers and returns, again leaving the old vale of ESP on top of the stack, where it will be harmlessly popped off once the 32-bit subroutine is complete (see FIG. 4).

Thus, any data objects on the stack to be shared between 16 and 32-bit subroutines will not cross a 64K byte boundary, while also not interfering with the smooth calling between other 32-bit subroutines.

When the active 32-bit subroutine actually issues a call to a 16-bit function, the compiler issues a call to a general purpose thunk routine from its runtime library. In the preferred embodiment, the thunk reallocates a portion of space in the 32-bit stack for use by the 16-bit subroutine, as illustrated in FIG. 4.

An alternate solution is to allocate a completely separate stack for use by the 16-bit subroutine. This has the advantage of allowing the callee to lock the stack. Also, the same 16-bit stack could then be used over an entire thread (ie, for several 32-bit subroutines). The disadvantage of separate stack allocation is that this would increase the storage requirements of the program and reduce its performance.

In the applicant's preferred embodiment, a default setting of 4K bytes is automatically reallocated as 16-bit stack space within the the 32-bit stack unless the user specifies a larger space requirement for the 16-bit code. Where a programmer wishes to allocate a larger stack space for the 16-bit call, a "#pragma stack16(#bytes)" statement is used in the applicant's specific embodiment in the C programming language. The maximum value setting for 16-bit stack space in this embodiment is 64K bytes, less small areas reserved for use by the compiler, the thunk and the parameter list passed to the 16-bit code (between about 50 to 70 bytes each). If a value larger than this is specified, the thunk routine will make the 16-bit area within the stack as large as possible.

To address the problem of compatibility in pointers, when an actual call to 16-bit code is made, the compiler itself is provided with support for automatically converting any flat pointers to segmented pointers using the conversion described above prior to calling the general purpose thunk. In addition to the pointer conversion, the compiler causes a word aligned parameter list to be built on the stack in exactly the way that a 16-bit function would recognise a call from another 16-bit function. The compiler then pushes the number of bytes in the newly built parameter list, the address of the 16-bit code subroutine to call, and a 32-bit word ("dword") of flags indicating which 16-bit calling convention to use.

Following this, the compiler generates a call to the general purpose thunk routine.

In the case of C compilers used in the preferred embodiment of the invention, there are three common 16-bit calling conventions supported, _Far16 _Cdecl, _Far16 _Pascal and _Far16 _Fastcall. The convention selected is determined by the user and specified to the compiler in a known manner.

On the thunk's entry, the stack is dword aligned and is laid out, from low memory to high memory, with the following data:

1. one dword of call flags
2. the address of the 16-bit routine to call, as a 32-bit pointer;
3. the number (rounded up to a word, not a dword) of bytes of parameter to follow;
4. the parameters stored exactly as a 16-bit compiler would store them; and
5. a 56 byte reserved area for use by the thunk.

The thunk implements the following:

1. It effects a precautionary save of all processor register values in a 56 byte area of the stack; and
2. It calls the 16-bit function indirectly, through a 16-bit code subroutine within the thunk itself. By this subterfuge, the 16-bit function called believes that it has been called by 16-bit code.

In addition, in the case where return values are required, the thunk manipulates the 16-bit return values to permit the 32-bit code to access them as though a 32-bit function had been called.

On completion of the 16-bit call, the thunk restores all processor registers saved to permit the continuation of the 32-bit subroutine.

Although the foregoing invention has been particularly shown and described with reference to the preferred embodiment, as the invention is not dependant on programming language or operating system, it will be appreciated by those skilled in the art that modifications may be made without departing from the spirit of the invention.

What is claimed

1. In a computing environment, a method for calling a 16-bit code from a 32-bit subroutine, in which at least one stack frame in a memory stack is allocated to the 32-bit subroutine, comprising the computer implemented steps of:

defining a consecutive series of 64K byte boundaries in the stack;

providing means for accessing variables and data objects spanning any 64K byte boundary defined in the stack from below the 64K byte boundary;

building a parameter list in the stack in 16-bit form; and allocating stack space for data to be used by the 16-bit code.

2. A method, according to claim 1, wherein the means provided for accessing variables and data objects below the 64K byte boundary comprises:

first means for determining if any variables or data objects span any 64K byte boundary in the stack; and second means for copying any variable or data object spanning a 64K byte boundary below that 64K byte boundary.

3. A method, according to claim 2, further comprising the step of creating a record of original register values in the stack before copying any variables or data objects below any 64K byte boundary.

4. A method, according to claim 3, wherein the step of creating a record of original register values in the stack comprises the steps of:

locating a stack pointer indicative of a layout in the stack; and reserving the original value of said stack pointer on the top of the stack, whereby to permit restoration of the original layout of the stack, following procedure exit of the 16-bit code from the stack.

5. A method, according to claim 3, wherein the step of creating a record of original register values in the stack comprises constructing a separate record of all processor registers in the stack.

6. A method according to claim 1, wherein the stack space is allocated in a separate stack from the 32-bit stack.

7. A method according to claim 1, wherein stack space is reallocated from the 32-bit stack for use by the 16-bit code.

8. A procedure call mechanism for implementing calls to 16-bit code from 32-bit code in a computer program in which at least one stack frame in a memory stack is allocated to the computer program, the procedure call mechanism comprising:

a transition preparation element having means for locating in the stack frame any variables or data objects spanning any 64K byte boundary in the stack, and including means for accessing any located variables or data objects which span a 64K byte boundary from below the 64K byte boundary; and control transfer means for allocating stack space for use by the 16-bit code called by the 32-bit code.

9. A procedure call mechanism, according to claim 8, wherein the transition preparation element comprises:

means for defining a consecutive series of 64K byte boundaries in the stack;

means for examining the stack to locate any variables or data objects spanning any 64K byte boundary defined in the stack; and means for copying any located variables or data objects below its associated 64K byte boundary.

10. A procedure call mechanism, according to claim 9, wherein the transition preparation element further comprises recording means for creating a least one record of a stack pointer value and processor registers prior to defining the consecutive series of 64K byte boundaries.

11. A procedure call mechanism, according to claim 8 wherein the control transfer means further comprises means for building a parameter list compatible with 16-bit code calling in the stack.

12. A procedure call mechanism, according to claim 8 or 11, wherein the control transfer means further comprises recording means for creating at least one record of 32-bit parameters from the stack frame.

13. A procedure call mechanism, according to claim 8, wherein the transition preparation element and control transfer means are normally located in a runtime library of a compiler.

14. A procedure call mechanism, according to claim 13, wherein the transition preparation element is responsive to the compiler locating at least one call to 16-bit code from the 32-bit code in the program, and wherein the control transfer means is responsive to any call to 16-bit code from the 32-bit code in the program.

15. In a computer system, a method for providing a 16-bit function with access to data objects in a memory stack shared with at least one 32-bit subroutine, the method including the computer system-implemented steps:

compiling a 32-bit subroutine;

during compilation of the 32-bit subroutine, recognizing a call to a 16-bit function and issuing to the 32-bit subroutine a call to a preparation routine;

executing the 32-bit subroutine;

calling the 16-bit function from the 32-bit subroutine;

prior to execution of the 16-bit function, calling the preparation routine;

executing the preparation routine by:
 defining 64K byte boundaries in the memory stack;
 identifying at least one data object which spans a 64K byte boundary; and
 copying the at least one data object to an area of the memory stack in which the at least one data object does not span a 64K byte boundary;
 and, executing the 16-bit function.

16. A combination operable in conjunction with a digital processing apparatus to provide a 16-bit function with access to data objects in a memory stack shared with at least one 32-bit subroutine, the combination including:

compiler means for compiling a computer readable program code embodying a 32-bit subroutine;

the compiler means placing in the 32-bit subroutine a call to a 16-bit function; and preparation routine means responsive to the call to the 16-bit function and executable prior to execution of the 16-bit function for:
 defining 64K byte boundaries in a memory stack shared by the 16-bit function and the 32-bit subroutine;
 identifying at least one data object which spans a 64K-byte boundary; and
 copying the at least one data object to an area of the memory stack in which the at least one data object does not span a 64K-byte boundary.

17. A combination operable in conjunction with a digital processing apparatus to provide a 16-bit function with access to data objects in a memory stack shared with at least one 32-bit code function, the combination including:

a 32-bit code function including a call to a 16-bit function; and preparation routine means responsive to the call to the 16-bit function and executable prior to execution of the 16-bit function for:
 defining 64K byte boundaries in a memory stack shared by the 16-bit function and the 32-bit code routine;
 identifying at least one data object which spans a 64K byte boundary; and
 copying the at least one data object to an area of the memory stack in which the at least one data object does not span a 64K boundary.

18. A preparation routine code product operable in conjunction with a digital processing apparatus to provide a 16-bit function with access to data objects in a memory stack shared with at least one 32-bit code routine, the preparation routine code product including:

means for receiving a call from a 32-bit code routine to a 16-bit function; and means responsive to the call to the 16-bit function for:
 defining 64K byte boundaries in a memory stack shared by the 16-bit function and the 32-bit code routine;
 identifying at least one data object which spans a 64K byte boundary in the memory stack; and
 copying the at least one data object to an area of the memory stack in which the at least one data object does not span a 64K byte boundary; and a 16-bit subroutine means for calling the 16-bit function.

* * * * *

UNITED STATES PATENT AND TRADEMARK OFFICE
CERTIFICATE OF CORRECTION

PATENT NO. : 5,487,158
DATED : January 23, 1996
INVENTOR(S) : Ameline, et. al.

It is certified that error appears in the above-indentified patent and that said Letters Patent is hereby corrected as shown below:

Title page, under item [19], inventor: should be-- Ameline et al--.

Title page, item [75], iventor: should be --Iam R. Ameline--.

Signed and Sealed this

Thirtieth Day of July, 1996

Attest:

BRUCE LEHMAN

*Attesting Officer*      *Commissioner of Patents and Trademarks*